United States Patent Office 3,045,419
Patented July 24, 1962

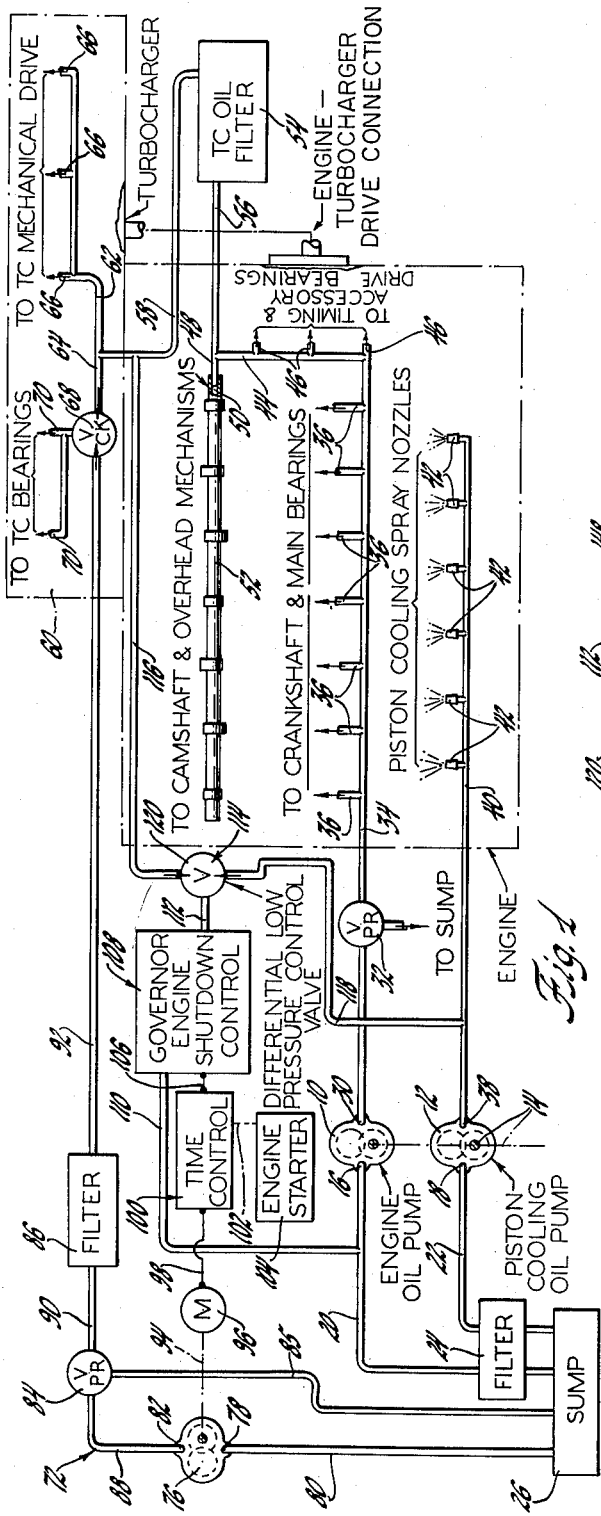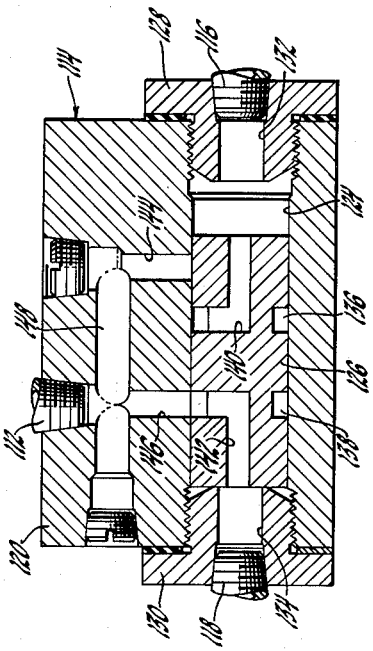

3,045,419
LUBRICATION SYSTEMS AND PROTECTIVE CONTROLS FOR TURBOCHARGED ENGINES
Albert N. Addie, La Grange Park, and Max Ephraim, Jr., Chicago, Ill., assignors to General Motors Corporation, Detroit, Mich., a corporation of Delaware
Filed May 18, 1961, Ser. No. 110,970
6 Claims. (Cl. 60—13)

This invention relates generally to an internal combustion engine; more particularly to a lubrication system and related protective controls for such an engine; and with regard to certain more specific aspects thereof, to a lubrication and protective control system particularly adapted for use in a turbocharged engine of a compression ignition type.

The invention has particular application to the turbocharging of a large compression ignition engine of a size adapted to provide continuous locomotive, marine and industrial power requirements. Relatively high mechanical and thermal loads are imposed on the various load carrying and combustion chamber defining components of such a turbocharged engine. To provide requisite operational durability, such load factors dictate the redesign of various components of the previously non-turbocharged engine and require the maintenance of adequate pressurized oil supply for both lubrication and cooling purposes.

The invention contemplates an improved lubrication system for an engine of the type indicated including separate pumps supplying oil for engine and turbocharger lubrication and for piston cooling purposes and related engine shutdown effecting protective controls operable in response to differential pressures in the several oil supply systems to insure the maintenance of adequate oil supplies for both engine and turbocharger lubrication and cooling under all engine operating conditions.

The foregoing and other objects, advantages and features of the invention will be more thoroughly understood from the following description of a preferred illustrative embodiment thereof, having reference to the accompanying drawing, in which:

FIGURE 1 is a diagrammatic view of an engine lubricating and engine protective control system constructed in accordance with the invention; and FIGURE 2 is a sectional view of a differential pressure operated valve operable to supply the lower oil pressure in the several supply systems to the engine shutdown effecting control.

As shown diagrammatically in FIGURE 1, the engine lubrication system includes two gear pumps 10 and 12 having a common engine driven impeller shaft 14. These pumps respectively supply pressurized oil to separate engine lubrication and piston cooling supply systems. Suction intake ports 16 and 18 of the pumps 10 and 12 have suitable connections at 20 and 22 with a high capacity oil filter device 24 associated with the engine oil sump 26. The discharge port 30 of the engine oil pump 10 is connected through a pressure regulating relief valve 32 to the main oil distribution gallery of the engine which is indicated at 34. The main gallery is connectable through branch passages indicated at 36 to the crankshaft main bearings and oil supply passages.

The discharge port 38 of the piston cooling oil supply pump 12 is directly connected to a distribution gallery or conduit 40 having a plurality of nozzles 42 associated therewith. These nozzles are adapted to continuously direct a stream or spray of cooling oil into the combustion chamber defining portions of the several engine pistons. Since the pump 12 is directly driven by the engine, the piston cooling effect provided thereby varies substantially in accordance with engine speed.

A timing and accessory drive oil supply gallery 44 intersects the main lubrication supply gallery 34 at its end distal from the pressure supply pump 10. This timing and accessory drive gallery extends vertically of the engine and is connected through several branch passages indicated at 46 to the various timing gear and accessory drive bearings. The gallery 44 is suitably connected at its upper end at 48 to the adjacent end of an oil distribution gallery 50 which extends longitudinally of a camshaft 52 and supplies oil from lubrication of the several camshaft bearings and overhead valve mechanisms. The upper end of the timing and accessory drive gallery 44 is also connected through a "fine" oil filter unit 54 and conduits 56 and 58 for oil supply to an engine mounted turbocharger 160.

The turbocharger is preferably of the type shown and described in co-pending United States patent application Serial No. 776,099 entitled "Compressor Mechanism for Internal Combustion Engines and the Like," filed November 24, 1958, in the names of Albert N. Addie and Brian M. Gallagher. In this turbocharger, an alternate mechanical drive augments the compressor driving torque of the exhaust gas driven turbine to insure an adequate supply of charging and scavenging air under low speed and power and engine accelerating operating conditions. This mechanical drive is overdriven by the turbine through an overrunning clutch or coupling under higher engine speed and load output conditions. Oil distribution branch passages 62 and 64 within the turbocharger are connected to the filtered oil supply conduit 58. The branch passage 62 is connectable as indicated at 66 to the several bearings of the mechanical drive and the branch passage 64 is connectable through a two-way check valve 68 and branch connections indicated at 70 to the critical turbine heat exposed bearings of the turbocharger proper. The branch connections 70 of the turbocharger are alternatively connectable through the check valve 68 to an auxiliary oil supply system 72.

The auxiliary oil supply system for the turbocharger is controllable by engine starting and shutdown effecting controls associated with the engine governor and is selectively operable thereby to provide oil to prelubricate the turbocharger bearings prior to engine starting and for bearing cooling purposes for a limited period of time after engine shutdown. The auxiliary supply system 72 comprises a pump 76 having an inlet port 78 connected by a conduit 80 to the engine oil sump 26. A discharge port 82 is connected through a pressure regulating valve 84, a "fine" oil filter 86 and interconnecting conduits 88, 90 and 92 to one inlet of the two-way check valve 68. The valve 84 is also connected to the oil sump through a pressure relieving bypass conduit 85. The pump 76 is drivingly connected as indicated at 94 to an electrical motor 96. The motor 96 is in turn electrically connected at 98 to a time control switch mechanism 100. This switch mechanism is connected at 102 to the engine starting control 104 and 106 to the engine shutdown control 108 of the engine governor and is selectively operable thereby to energize the auxiliary pump driving motor for a limited period of time sufficient to prelubricate the critical high speed and heat exposed bearings of the turbocharger prior to engine starting and for a second period of time sufficient to prevent destructive soak-back heating of the turbocharger bearings after engine shutdown effecting operation of the governor control. Such prestarting and soak-back cooling oil supply is isolated from the main engine oil supply system by the two-way check valve 68.

The engine governor and its related shutdown control is preferably of a type similar to that shown and described in copending United States patent application Serial No. 112,887 entitled "Governor Mechanism," filed May 26, 1961, in the name of Lauren L. Johnson. Such a governor mechanism is provided with remote speed setting and engine speed and load regulating servo mechanisms which cooperate to provide constant output load characteristics corresponding to each of the engine speed settings. The engine protective control associated wtih such a governor is operable to effect engine shutdown in response to either an excessive suction or a low engine oil pressure signal applied thereto.

In the illustrative embodiment of the invention, the suction of the engine oil pump 10 is applied to the engine shutdown effecting control 108 through a conduit 110 connected to the pump intake connection 20. The oil pressure signal is supplied to the low oil pressure shutdown control through a connection 112 and a differential pressure actuated shuttle valve 114. Conduits 116 and 118 connect the opposite inlets of the shuttle valve to the engine oil supply system adjacent the turbocharger and to the discharge conduit 40 of the piston cooling oil pump 12, respectively. The shuttle valve is operable to apply the lower of these two pressures to the engine shutdown controls.

As shown in greater detail in FIGURE 2, the shuttle valve 114 includes a housing 120 having a bore 124 reciprocably mounting a shuttle valve member 126. The opposite ends of the bore 124 are closed by pressure fittings 128 and 130 having connections at 132 and 134 to the adjacent ends of the conduits 116 and 118, respectively. The engine and turbocharger lubrication and the piston cooling oil supply pressures are thus supplied to the closed ends of the valve mounting bore 124 and the higher of these two pressures is operable to shift the shuttle valve 126 into engagement with the lower pressure supplied end fitting. The valve member has two spaced annular grooves 136 and 138 which are connected through passages 140 and 142 to the opposite ends of the valve member and thus to the turbocharger lubrication and piston cooling oil supply conduits, respectively. In either extreme position of the shuttle valve member, the grooves 136 and 138 are alternatively alignable with axially spaced ports 144 and 146 opening on the valve mounting bore 124. These ports are interconnected through a housing passage 148 to the shutdown control connection 112. The higher oil perssure thus applied actuates the shuttle valve member 126 to a position wherein the lower pressure is supplied to the shutdown control mechanism. Should this lower pressure be below that required for safe engine or turbocharger operation or for piston cooling under load, its application to the engine protective control is operable to effect engine shutdown.

From the foregoing description, it will be seen that the lubrication protective control system of the invention insures adequate prelubrication of the critical turbocharger bearings prior to engine starting, insures adequate oil supply pressures for proper engine and tubocharger lubrication and for piston cooling purposes under all engine speed and load operating conditions and automatically provides adequate cooling oil to prevent soak-back heating of the critical turbocharger bearings in response to operation of the engine shutdown effecting control.

While the invention has been shown and described with reference to a single illustrative embodiment, it will be apparent that various changes and departures might be made therefrom without departing from the spirit and scope of the invention as defined in the following claims.

We claim:

1. In an internal combustion engine power plant including an exhaust gas driven turbocharger, a lubrication and protective control system comprising a first means normally operable to supply pressurized oil for lubrication of the several engine and turbocharger bearings at a predetermined maximum pressure, a second means normally operable to supply pressurized oil for cooling of the several pistons of the engine in accordance with engine speed, engine control means normally operable to initiate and maintain engine operation and including pressure responsive means operable to effect engine shutdown in response to oil pressure supplied thereto below a predetermined minimum pressure, differential pressure actuated valve means intermediate said first and second oil pressure supply means and operable to supply the lower of said pressures to said engine shutdown pressure responsive means, check valve means operable to prevent reverse fluid flow from said turbocharger bearings to said first oil pressure supply means, a third pressure supply means connectable to said turbocharger bearings through said check valve means and energizable to supply pressurized oil to said turbocharger bearings independently of engine operation, and time control means connected to said engine control means and selectively operable thereby to energize said third pressure supply means for limited periods for prelubrication of the turbocharger bearings prior to engine starting and for bearing cooling subsequent to engine shutdown.

2. In an internal combustion engine, a lubrication system including a first oil pressure supply means, passage means connected to said first pressure supply means and operable to distribute pressurized oil to the several engine and accessory drive bearings, and valve means for limiting the lubricating oil supply normally to a predetermined maximum pressure; a piston cooling oil supply system separate from said engine lubricating system and including a second oil pressure supply means and passage and nozzle means connected thereto for distributing cooling oil into the several pistons of the engine, said second oil pressure supply means being operable to supply pressurized oil to the several nozzles substantially as a function of engine speed; an exhaust gas driven turbocharger mounted on said engine and operable to supply pressurized charging air to the engine, said turbocharger including a means for drivingly connecting said turbocharger to the accessory drive of said engine during low speed and power operation and having a first passage means connecting the bearing surfaces of said drive connecting means directly to said lubrication system and a second passage means connecting the turbine and compressor mounting bearings of said turbocharger to said engine lubrication system through a check valve means operable to prevent reverse fluid flow from said turbocharger bearings to said lubrication system; engine control means normally operable to initiate and maintain engine operation and including pressure responsive means operable to effect engine shutdown in response to an oil pressure signal supplied thereto below a predetermined minimum pressure, differential pressure actuated means intermediate said first and second oil pressure supply passage means and operable to supply the lower of said pressures to said engine shutdown pressure responsive means, said valve means being connected to first pressure supply passage means immediately adjacent said turbocharger; an auxiliary pressure supply means connected to said turbocharger bearings through said check valve means and energizable to supply pressurized oil to said turbocharger bearings independently of said lubrication supply system; and timing means connected to said engine control means and selectively operable thereby to energize said auxiliary supply means for limited prelubrication of the turbocharger bearings prior to engine starting and bearing cooling subsequent to engine shutdown.

3. In a power plant including an internal combustion engine and an exhaust gas driven turbocharger, engine control means normally operable to initiate and maintain engine operation and including pressure responsive means operable to effect engine shutdown in response to an oil pressure signal supplied thereto below a predetermined minimum pressure, a first means normally operable to supply pressurized oil to the several engine and turbocharger bearings, check valve means operable to prevent reverse fluid flow from said turbocharger bearings to said first oil pressure supply means, said pressure responsive means being connected to said first pressure supply means adjacent said check valve means, a secondary pressure supply means connectable to said turbocharger bearings through said check valve means and energizable to supply pressurized oil to said turbocharger bearings independently of engine operation, and timing means connected to said engine control means and selectively operable thereby to energize said secondary supply means for limited prelubrication of the turbocharger bearings prior to engine starting and for bearing cooling subsequent to engine shutdown.

4. In a power plant including an internal combustion engine and an exhaust gas driven turbocharger, engine control means operable to initiate and maintain engine operation and to effect engine shutdown, a first means operable to supply pressurized oil to the several engine and turbocharger bearings during engine operation, valve means operable to prevent reverse fluid flow from said turbocharger bearings to said first oil pressure supply means, a secondary pressure supply means connected to said turbocharger bearings and energizable to supply pressurized oil thereto independently of engine operation, and said engine control means including timing means selectively operable thereby to energize said secondary supply means for limited prelubrication of the turbocharger bearings prior to engine starting and for bearing cooling subsequent to engine shutdown.

5. A lubrication and protective control system for an internal combustion engine comprising a first means normally operable to supply pressurized oil for lubrication of the several engine and accessory bearings at a predetermined maximum pressure, a second means normally operable to supply pressurized oil for cooling of the several pistons of the engine in accordance with engine speed, a pressure responsive control means operable to effect engine shutdown in response to an oil pressure signal supplied thereto below a predetermined minimum pressure, and a differential pressure actuated valve means intermediate said first and second oil pressure supply means and operable to supply the lower of said pressures to said engine shutdown control means thereby insuring adequate oil supply for both lubrication and piston cooling purposes under all engine operating conditions.

6. In an internal combustion engine power plant including an exhaust gas driven turbocharger, said turbocharger having a mechanical drive connectable to said engine and operable to augment the turbine of the turbocharger during low speed and power operation of the engine, a lubrication and protective control system for said power plant comprising a first means normally operable to supply and distribute pressurized oil to the several engine bearings and the turbocharger mechanical drive at a predetermined maximum pressure, a second means normally operable to supply and distribute pressurized oil for cooling of the several pistons of the engine in accordance with variations in engine speed, engine control means normally operable to initiate and maintain engine operation, pressure responsive means associated with said control means and operable thereon to effect engine shutdown in response to an oil pressure signal supplied thereto below a predetermined minimum pressure, a differential pressure actuated valve means intermediate said first and second oil pressure supply means and operable to supply the lower of said pressures to said engine shutdown pressure responsive means, said valve means being connected to said first pressure supply means immediately adjacent said mechanical drive, said turbocharger having first passage means connecting the bearings of said mechanical drive to said first oil pressure supply means, a second passage means for connecting the turbine and compressor mounting bearings of said turbocharger to said first oil pressure supply means, a first check valve means associated with said second passage means and operable to prevent reverse fluid flow from said turbocharger bearings to said first pressure supply means, a third means connected to satid second passage means through a second check valve means and energizable to supply pressurized oil to said turbocharger bearings independently of engine operation, and time control means connected to said engine control means and operable thereby to energize said third pressure supply means for limited periods of time prior to engine starting and subsequent to engine shutdown.

No references cited.

UNITED STATES PATENT OFFICE

CERTIFICATE OF CORRECTION

Patent No. 3,045,419     July 24, 1962

Albert N. Addie et al.

It is hereby certified that error appears in the above numbered patent requiring correction and that the said Letters Patent should read as corrected below.

Column 2, line 15, for "160" read -- 60 --; column 6, line 33, for "satid" read -- said --.

Signed and sealed this 4th day of December 1962.

(SEAL)
Attest:

ERNEST W. SWIDER
Attesting Officer

DAVID L. LADD
Commissioner of Patents